May 18, 1926.　　　　　　　　　　　　　　　1,585,530
T. E. BUSCHMANN ET AL
TYPEWRITING AND CALCULATING MACHINE
Filed Sept. 30, 1925　　8 Sheets-Sheet 4

May 18, 1926.

T. E. BUSCHMANN ET AL 1,585,530

TYPEWRITING AND CALCULATING MACHINE

Filed Sept. 30, 1925    8 Sheets-Sheet 5

Inventor: Theodor Eugen Buschmann
and Christian Emil Arno Claus
By: Monks & Clerk Attys May 18, 1926. 1,585,530
T. E. BUSCHMANN ET AL
TYPEWRITING AND CALCULATING MACHINE
Filed Sept. 30, 1925 8 Sheets-Sheet 6

Inventor: Theodor Eugen Buschmann
and Christian Emil Arno Claus
By Marks & Clerk Attys May 18, 1926.

T. E. BUSCHMANN ET AL

TYPEWRITING AND CALCULATING MACHINE

Filed Sept. 30, 1925    8 Sheets-Sheet 8

Inventor: Theodor Eugen Buschmann
and Christian Emil Arno Claus
By: Marks & Clerk
Attys Patented May 18, 1926.

1,585,530

UNITED STATES PATENT OFFICE.

THEODOR EUGEN BUSCHMANN AND CHRISTIAN EMIL ARNO CLAUS, OF CHEMNITZ, GERMANY, ASSIGNORS TO WANDERER WERKE, VORM. WINKLHOFER & JAENICKE, A. G., OF SCHONAU, NEAR CHEMNITZ, GERMANY.

TYPEWRITING AND CALCULATING MACHINE.

Application filed September 30, 1925, Serial No. 59,650, and in Germany July 3, 1924.

This invention relates to a so-called calculating and typewriting machine, that is to say, a typewriter in combination with one or more calculating devices which are mounted in a known manner on the typewriter carriage in the form of separate counting mechanisms for column addition in such a way that they are fitted on to one rail of the typewriter carriage, and are displaced therewith, during which movement, in the carrying forward from column to column, a setting-up or adjusting wheel, by means of a key-actuated appliance for the calculating or counting mechanism, comes into operative connection with the associated setting-up wheels of the individual columns of the counting mechanisms.

According to the invention the key-operated numerical values are transmitted by means of cam devices to a rotatable shaft which is provided with angularly displaced members embodying the unit numerals from 1 to 9. By means of these cam devices, which are alike for all the key levers, the rotatable shaft is rotated to a greater or less extent according to the numerical value. A gearing located at the end of the shaft transmits these movements by means of a perpendicular shaft and of an intermediate member to the calculating mechanisms. This gearing, more particularly the perpendicular shaft, also serves moreover for closing a clutch by means of which a source of power, such as a stressed spring, a continuously running motor or the like, is connected with the transmission mechanism that transmits to the counting mechanism carried by the paper carriage by employing a known stepped cylinder co-operating with the setting-up wheel, the keyed numerical value reproduced by the displacing of the setting-up wheel relatively to the stepped cylinder. For determining the kind of calculation there serves a change gear inserted in this mechanism. For this purpose the perpendicular shaft is raised by means of switch levers and switch cams.

According to a further constructional form of the invention the cam plates moved by the numeral keys are adjustably constructed in such a way and provided with such engaging members for the key levers that they can be rocked through small angular distances in such a manner that upon a key being struck either the associated cam plate is rocked and the calculating mechanism actuated or all the numeral keys are locked if the counting mechanism in its stepwise progression comes to a place at which a decimal point or similar punctuation mark is to be typed, or finally all the numeral keys are released only for the exclusive actuation of the writing mechanism, in which case they do not influence the calculating mechanism.

These three different adjustments of the cam plates are automatically brought about, according to the invention, by means of the counting mechanism mounted on the paper carriage of the typewriter during its displacement by the calculating mechanism. The two adjustments of the cam plates in which the numeral keys are moved either for actuating the calculating mechanism or without influencing the latter only for the ordinary writing may also be effected by hand, and the inversion of the cam plates for ordinary typing without affecting the calculating mechanism may also be effected by the usual reversing key. Thus the mechanisms and transmission members necessary for the realization of these various processes are, according to the invention, so constructed that they ensure the most satisfactory result with comparative simplicity. For preventing the simultaneous actuation of a plurality of keys, the keys not depressed are locked.

In the accompanying drawings the invention is illustrated in various constructional forms wherein the individual constituent parts of the new calculating apparatus are reproduced in part singly in various positions.

Figures 12 and 13 show another constructional form of the cam plates with the key and the transmitting members connected therewith in the calculating position, before and after the striking of the key respectively;

Figures 14$^a$, 14$^b$, and 14$^c$ illustrate in three positions a piece of apparatus serving for the raising of the usual perpendicular shaft;

Figure 15 shows one of the cam plates in the locked position of the keys;

Figure 16 shows the same cam plate in the released position of the keys for the exclusive actuation of the typing apparatus.

Figures 17 and 18 show the device for the adjustment of the cam plates by hand;

Figures 19 and 20 illustrate transmission members for rotating the perpendicular shaft for the purpose of actuating the adjusting setting-up wheel of the calculating mechanism;

Figures 21 and 22 show the transmission members actuated by the apparatus shown in Figures 14$^a$, 14$^b$, and 14$^c$ for raising the perpendicular shaft for the purpose of engaging the drive for the calculating apparatus;

Figures 23, 24, 25 and 26 show transmission members by which the adjustment of the cam plates is effected by the counting mechanism; and Figures 27 and 28 show a device for switching the driving motor off and on.

This application is an improvement over the typewriter calculating machine covered in the Patent 1,524,729 granted Feb. 3, 1925, to Buschmann.

Figure 1:
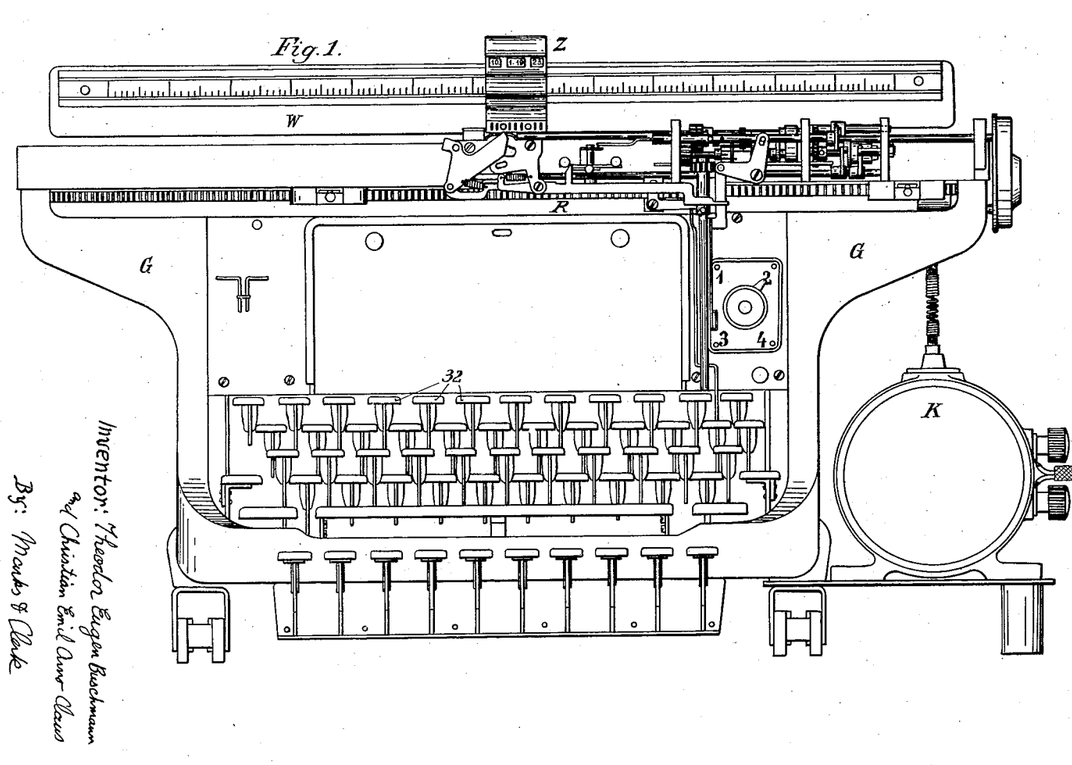
Figure 1 shows in front elevation a typewriting and calculating machine according to the invention with the typewriter frame G, the platen carriage W, the counting mechanism Z, the power-storage device with electric motor K, and the calculating apparatus R.
Figure 2:
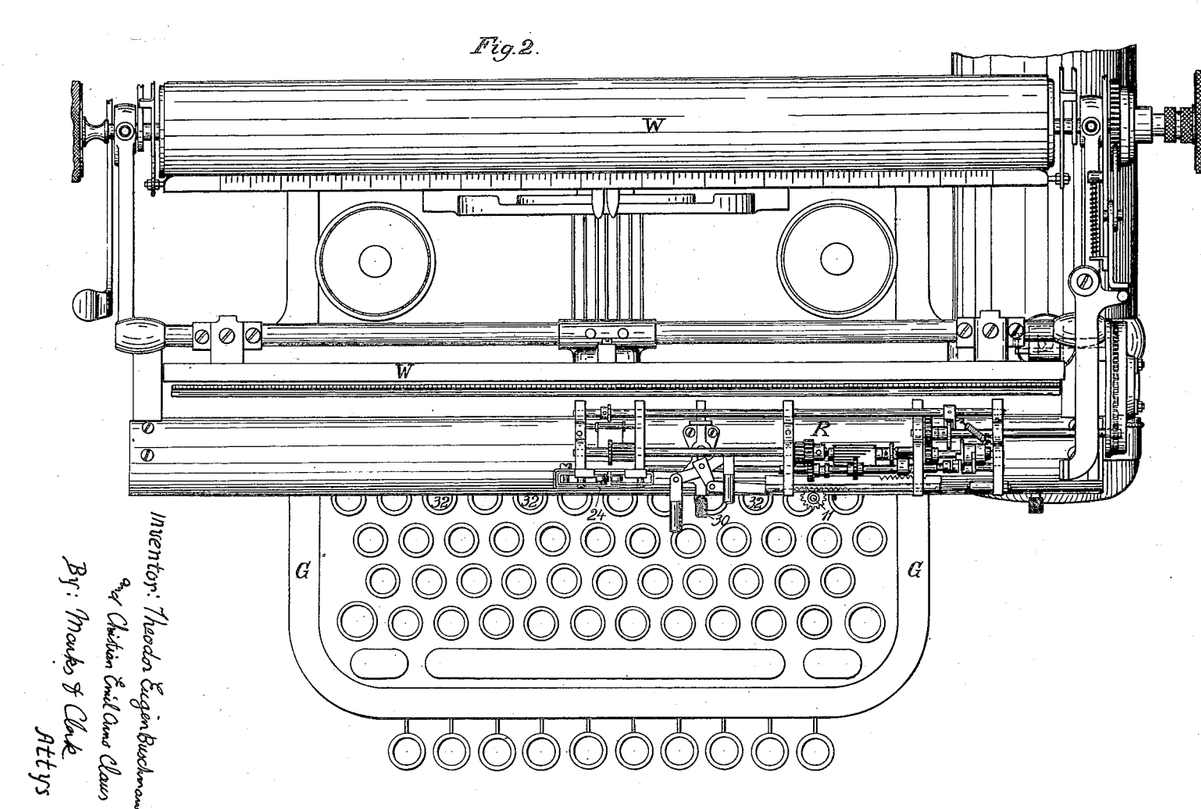
Figure 2 is a plan thereof.
Figure 3:
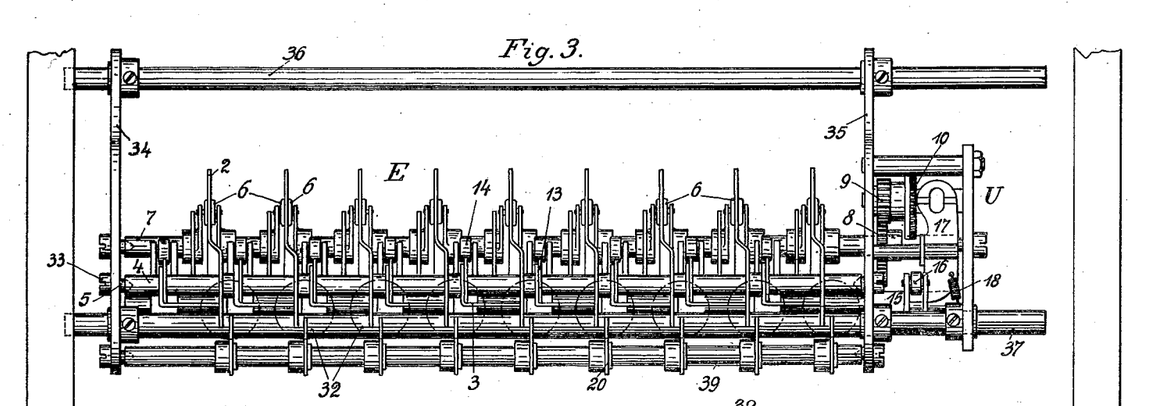
Figure 3 illustrates the numeral key mechanism E and the transmission mechanism U.
Figure 4:
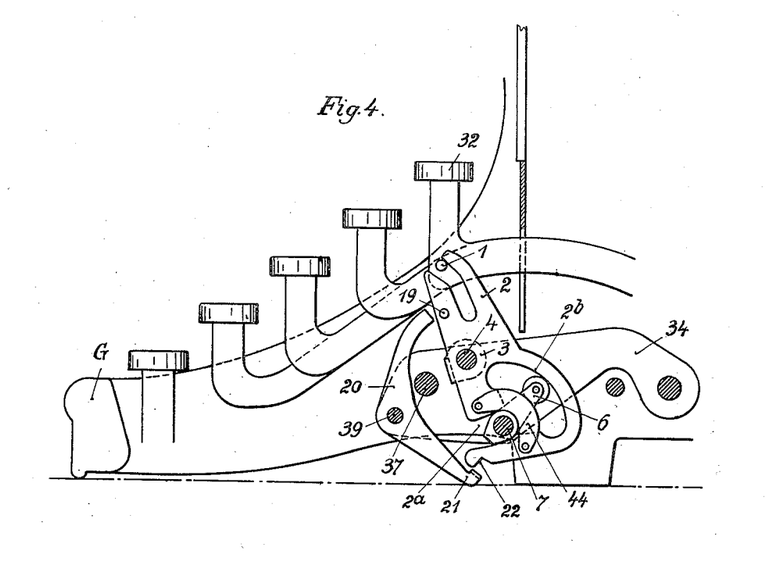
Figure 4 is a partial side elevation of the numeral key mechanism.
Figure 6:
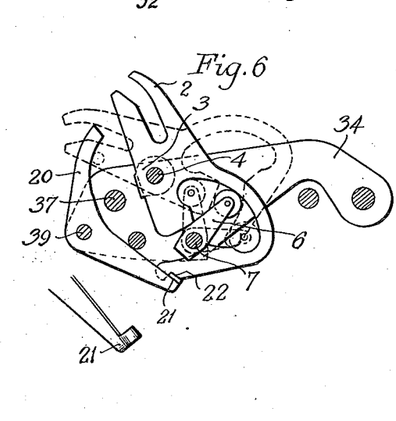
Figures 6 and 7 illustrate in side elevation details of the counting mechanism in different positions.
Figure 7:
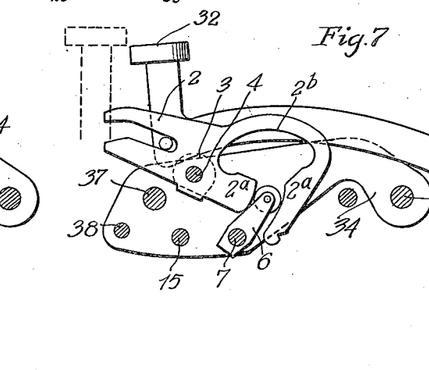

Each numeral key 32 of the typewriting and calculating machine, when depressed, engages, with a lateral pin 1, in a slot in a cam plate 2 (Figure 4) rotatable on a shaft 4, and rotates it in the manner shown in Figures 6 and 7. In order to enable these cam plates 2 to be easily and reliably rocked and to guide them laterally relatively to one another and individually they are provided with a bridge piece 3 (Figure 3) as a bearing. The shaft 4 of the cam plates 2 is adjustably supported at the ends by pointed screws 5 and nuts 33 in lateral members 34 and 35 of numeral key mechanism E. The entire numeral key mechanism and the transmission mechanism U are adjustably connected by carrying shafts 36 and 37 with the typewriter frame. Each of the cam plates 2 has at its lower end, a slot 2$^a$ (Figures 4, 6 and 7) and a cavity connected therewith which is bounded by a curve 2$^b$. The shape of the cam plate is the same for all the keys. A curved clip or stirrup 44 (Figure 4) bridging over the slot 2$^a$ in the cam plate at a corresponding distance, imparts to the slotted part of the cam plate the requisite strength and stiffness. In a condition of rest there are located in the apertures in the cam plates, bearing against the curves 2$^b$, roller levers 6, (Figures 4 and 6) which are secured to a shaft 7 at different angles, so that by their co-operation with the associated cam plates 2 they rotate the shaft 7 through angles of different sizes, whereby the various values of the series of numerals from 1 to 9 are expressed.

Figure 5:
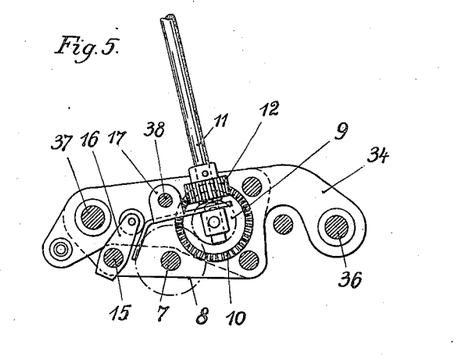
Figure 5 is a partial side elevation of the transmission mechanism.

Now if a numeral key 32 is depressed and the associated cam plate 2 thereby turned down (Figures 6 and 7) the associated roller lever 6 is guided with its roller into the slot 2$^a$ in the cam plate 2, while the roller levers belong to the other keys can rotate in the aperture or, in other words, on the curve 2$^b$ of the stationary cam plates 2, about the centre of the shaft 7. By the rocking of the roller levers the shaft 7 is rotated through an angle corresponding to the numerical value of the key depressed. This rotation of the shaft 7 is transmitted by transmission gearing U (Figures 3 and 5) which comprises two pinions 8 and 9 and a crown wheel 10, to an upwardly extending shaft 11 with a toothed wheel 12, which meshes with the crown wheel 10. By the rotation of the shaft 11 the value of the numeral key 32 depressed is transmitted to the calculating machine apparatus, whereby an adjusting or setting up pinion is adjusted to the numerical value in question relatively to a stepped cylinder. The setting-up pinion will not be further described here as it does not form part of the invention. The rod or shaft 11 in the present instance corresponds to the shaft 64 of the prior Patent 1,524,729 to Buschmann and in this connection reference is particularly directed to Figs. 4, 6, 7, 7$^a$ and 9 of said prior patent.

Figures 8, 9, 10, 11:
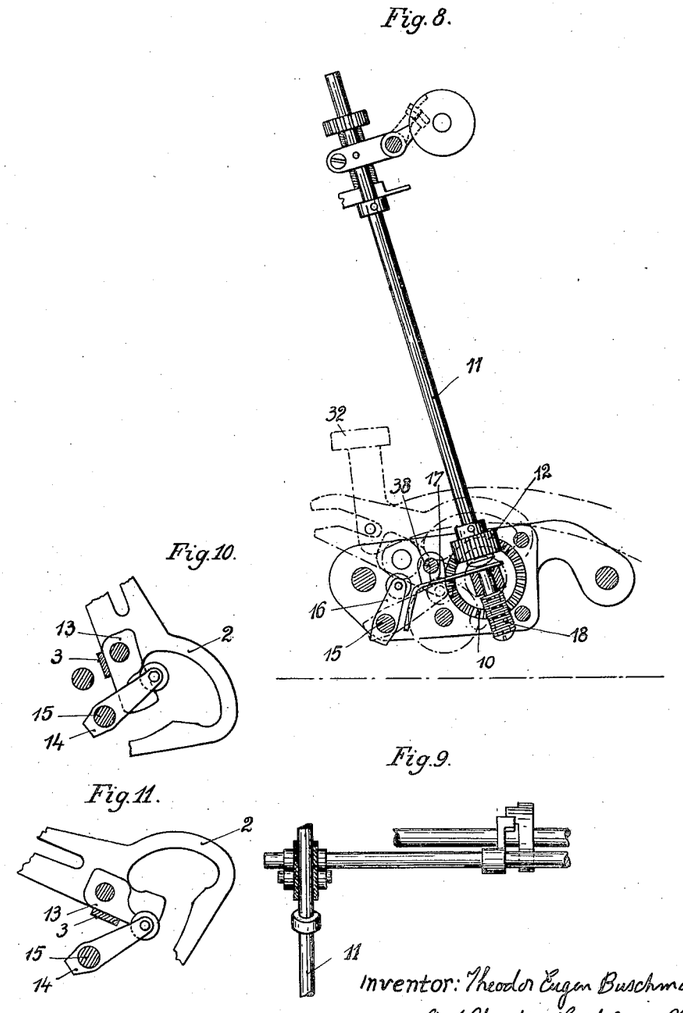
Figure 8 shows the clutch disengaged with the driving shaft raised.
Figures 9, 10 and 11 illustrate details thereof.

On the bearing bridges 3 of the cam plates 2 are provided, for all the numeral keys, equal switch cams 13 (Figures 10 and 11) which, upon the cam plates 2 moving, rock switch levers 14 (Figures 8, 10 and 11) which are alike for all the numerals keys and which are rigidly connected with a shaft 15. Under these circumstances the shaft 15 rotates to a corresponding extent with the switch levers 14 and presses by means of a switch lever 16 (Figures 3, 5 and 8) secured thereto upon one end of a rocking lever 17, which rotates on a shaft 38 and with its other end raises the shaft 11, with toothed wheel 12, as a result of which the clutch which connects the stepped cylinder and the further transmission apparatus with a source of power is closed. The parts of the typewriting and calculating machine that establish this connection, however, are not further described here, as they do not form part of the invention. A spring 18 (Figure 3) brings the shaft 11, with the toothed wheel 12, back into the position of rest.

In order to prevent the other numeral keys from moving when one numeral key is depressed, all the numeral keys are provided with similar locking levers 20 (Figures 3, 4 and 6) fixedly mounted upon a shaft 39 the bent-over ends 21 of which are pressed into notches 22 in the cam plates 2 which are not actuated, by providing on each cam plate 2 a pin 19, which, upon the cam plate 2 rotating, first slides along the associated locking lever 20 without moving it out of its normal position, and only turns down the lever 20, and with it the other locking levers 20 rigidly mounted on the shaft 39, when the cam plate 2 belonging to the depressed key is out of reach of its locking lever, so that the other cam plates become locked.

Figures 12, 13, 14A, 14B, 14C, 15, 16, 17, 18:
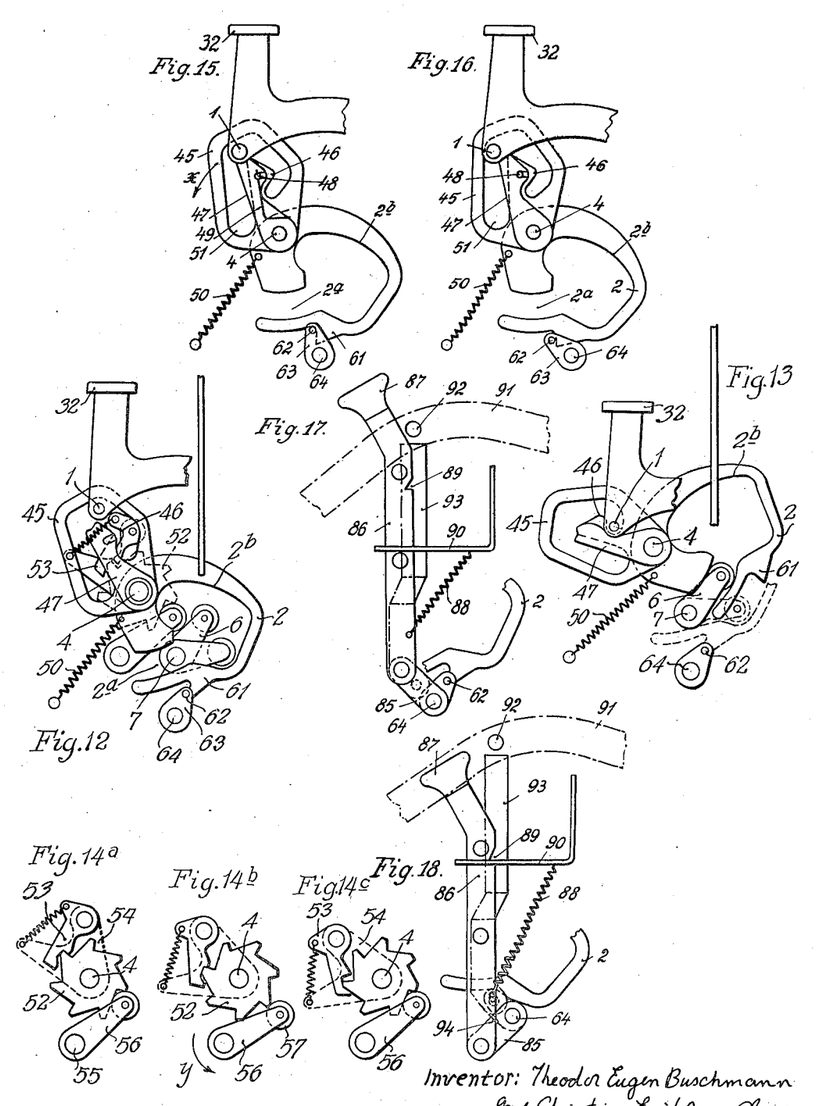

According to the constructional form of the invention shown in Figure 12 and the following figures the cam plates 2 have an upper part 45 closed in itself. The cam plate 2 itself is provided, in the same manner as in Figures 4, 6 and 7, with a slot $2^a$, connected with the guiding curve $2^b$ for the roller levers 6 arranged at different angles on the shaft 7, the roller lever belonging to the cam plate actuated being held stationary in the slot $2^a$ (Figure 13) after the depression of the key.

The upper part 45 of the cam plate 2 is formed with a tappet-shaped stop member 46, against which there bears a similarly shaped check piece 47, which is loosely supported on the shaft or pivot 4 of the cam plates, limited by a slot guide 48, and influenced by a blade spring 49 in the direction of the arrow $x$ (Figure 15).

By rotating the cam plates 2 through small angular distances they are adjustable into the three positions shown in Figures 13, 15 and 16, as a result of which the stop member 46, 47 is brought, in relation to the stop pin 1 on the key lever 32, into the three different positions also shown in the said figures.

If the cam plate 2, upon the key being struck is in the position shown in Figure 12, the stop pin 1 on the key lever 32 in striking against the upper bevelled edge of the stop member 46 and then sliding down along the latter rocks this stop member, and with it the cam plate, into the position illustrated in Figure 13, so that the calculating mechanism is correspondingly actuated. When the key rises, the cam plate under the action of a tension spring 50, goes back again into its original position.

If the cam plate takes up the position shown in Figure 15, rotated through a small angular distance towards the right, the stop pin 1 of the key 32, upon depression of the key meets the check piece 47 in a direction running approximately against the pivot 4, as a result of which the further movement is prevented. The numeral keys are accordingly locked, in this position of the cam plates (punctuation locking).

If the cam plate 2 is in the position shown in Figure 16, the stop pin 1 can move freely downwards within an aperture 51, that is to say, the calculating mechanism remains unaffected and the numeral keys are available exclusively for typing. The transmission of the partial rotations of the shaft 7 representing numerical values of the keys depressed to the ordinary upwardly extending shaft 11 is effected in this constructional form also (Figures 19 and 20) through the medium of the transmission gearing 8, 9 by a crown wheel 10, which engages with the driving pinion 12 mounted on the upwardly extending shaft 11.

For the raising and lowering of the upwardly extending shaft 11 for the purpose of engaging and disengaging the drive of the calculating mechanism, however the following device is in this instance provided, which differs substantially from the device hereinbefore described in connection with Figures 3, 5, 8, 10 and 11.

On the common pivot 4 of the cam plates 2 is loosely journalled for each of these cam plates a ratchet wheel or controlling star wheel 52 (see Figures 12, $14^a$, $14^b$, $14^c$, 21 and 22).

The teeth of these ratchet wheels are subject to the action of spring-actuated driving or locking pawls 53, which are supported on members 54 rigidly connected with the cam plates 2 and consequently they take part in the rocking of any cam plates actuated. The associated controlling star wheel 52 is thus rotated by the pawl 53 out of the position shown in Figure $14^a$, first into the position shown in Figure $14^b$, and then into the position shown in Figure $14^c$, that is to say, to the extent of one of the teeth, which may for example be seven in number.

On a common shaft 55 is mounted for each controlling star wheel 52 a lever 56, which carries at the end a roller 57, with which it is pressed against the teeth of the controlling star wheel in the direction of the arrow $y$ in consequence of the resilient influence of the shaft 55.

In the partial rotation of the controlling star wheel 52 effected by the pawl 53 the lever 56 is rotated first in the right-hand direction by the tooth of the controlling star wheel and then in the left-hand direction, with its roller 57 entering into the next gap. The partial rotations of the shaft 55 hereby produced (Figures 21 and 22) effect by means of a toothed segment 58, a toothed wheel 59 and a toothed part 60 of the upwardly extending shaft 11 meshing with the toothed wheel 59, the raising and lowering of the shaft 11, as a result of which as previously mentioned, the clutch which connects the known stepped cylinder and the further transmission apparatus with a source of power, is closed, so that the keyed numeral is transmitted to the counting mechanism.

In order to effect automatically at the correct moment during the intermittent displacement of the counting mechanism with the paper carriage from right to left, the aforementioned three different adjustments of the cam plates 2, the following device is provided:

All the cam plates 2, under the influence of their return springs 50 bear with toothed-shaped attachments 61 against stop pins 62 on levers 63, which are mounted on a common shaft 64 (Figures 12, 13, 15, 16, 23, 24, 25 and 26). According to this arrangement the various adjustments of the cam plates can be effected by corresponding rotation of this shaft 64. This is brought about from the counting mechanism through the medium of the following transmission devices, shown in Figures 23 to 26:

In the path of the counting mechanism 65 moving from right to left there is a stop tooth 66 which is rotatably mounted at 67 on an arm 68 of a bell-crank lever 70 pivoted to the machine frame at 69.

The stop tooth 66, when it is influenced from the right, bears against a stop 71 on the bell-crank lever 70 and rotates the bell-crank without executing a rotation about its own axis 67. If however the tooth 66 is influenced from the left it can yield by rotating about 67 in the right-hand direction and stretching the spring 72 and thus does not influence the bell-crank lever 68, 70.

Figures 22, 26, 27, 28:
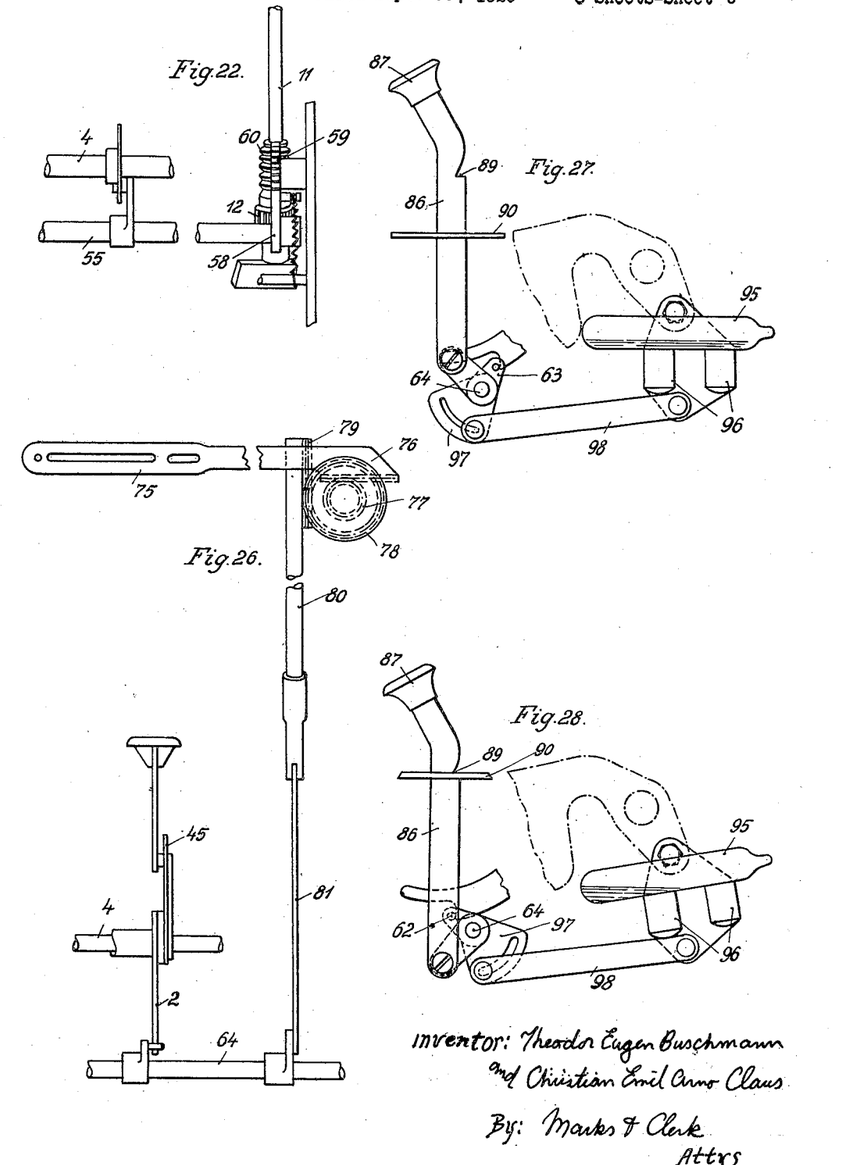

The bell-crank lever arm 70 is connected through the medium of a tension spring 73 and a slotted guide 74, with a rail 75, which, at its right-hand end is constructed as a rack 76. The latter meshes with a toothed pinion 77, upon the shaft of which is mounted a larger toothed wheel 78. The latter engages with a toothed attachment 79 on a sleeve 80 embracing the upwardly extending shaft 11, and this sleeve 80 is connected by a link member 81 with a lever 82 mounted on the shaft 64. The method of operation is as follows:

When the tip of the stop tooth 66, during the displacement of the counting mechanism, runs on to the under surface 83 of the latter, the bell-crank lever 68, 70 is rotated to a definite extent in the left-hand direction and the rail 75 is accordingly displaced towards the right (Figure 26).

Figures 19, 20, 21, 23, 24, 25:
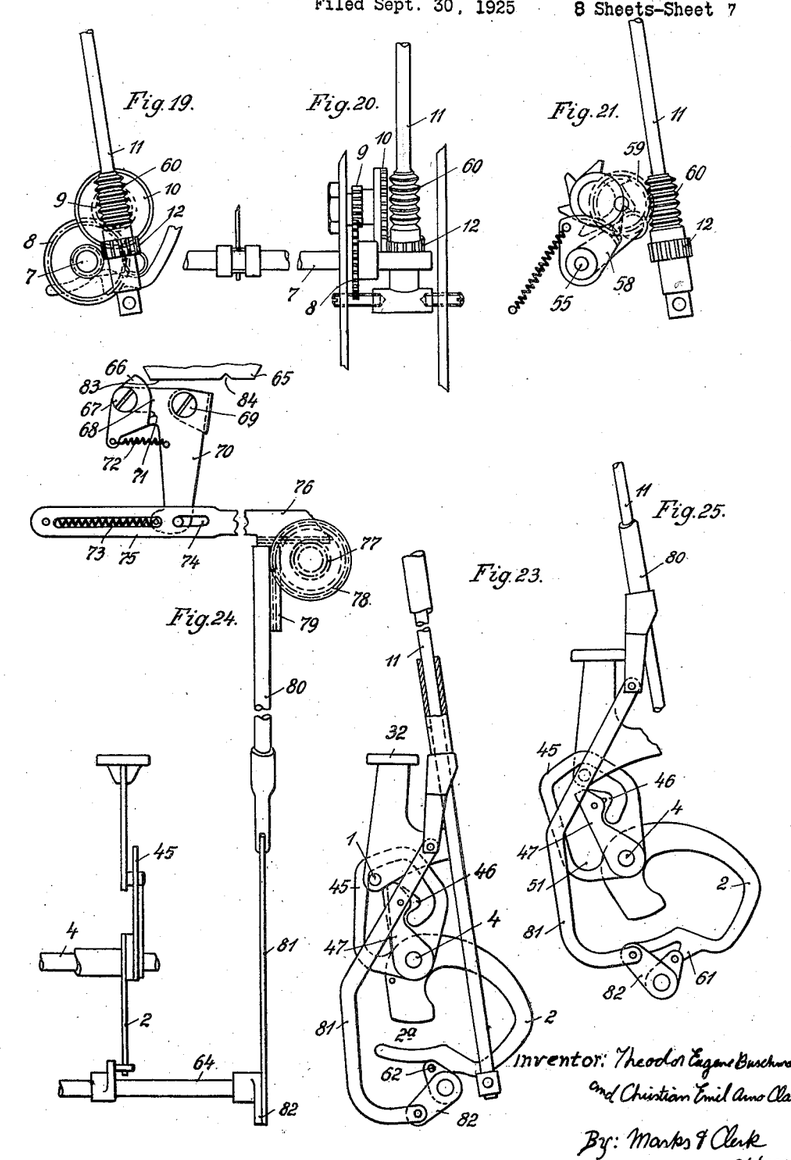

Under these circumstances, through the medium of the transmission members 76, 77, 78 and 79, the sleeve 80 is raised, and by the members 81, 82 the shaft 64 is rotated by such an amount that the levers 63 come out of the position illustrated in Figures 16 and 20 into the position shown in Figure 25 or in Figure 12. By this means all the cam plates are rocked into the calculating position illustrated in the last-mentioned figures. Now when the stop tooth 66, during the further movement of the counting mechanism, reaches the notch 84 in the latter, it enters the said notch owing to the action of the spring 73, with a reverse movement of all the transmission members. Under these circumstances the levers 63 are rotated back into the position shown in Figure 15, and the cam plates 2 take up, under the influence of the springs 58, the intermediate position indicated in the said figure, that is to say, the key or punctuation locking position. During the further movement of the counting mechanism the calculating position then automatically recurs and if the counting mechanism releases the stop 66 the idle position shown in Figure 16, or in Figure 23 occurs.

Furthermore, in the case of this constructional form of the invention, another device is provided, by means of which the cam plates can be shifted by hand from the calculating position to the idle position and conversely. This device is illustrated in Figures 17 and 18.

To a lever 85 mounted on the shaft 64 is pivoted an upwardly extending rail 86 which carries a press button 87 on the top. A tension spring 88 causes this rail, when the latter is pressed correspondingly far downwards, to engage by means of a notch 89 with a locking member 90 and to be locked in this position. Owing to the rotation of the shaft 64 occuring during the depression of the rail 86 the levers 63 are rotated into the position shown in Figure 16 and consequently the cam plates are rocked by their springs 50 into the idle position of the keys, that is to say, into the position for simple typewriting.

The same procedure takes p'ace when actuating the change-over key, owing to the fact that a pin 92 mounted on the change-over key lever 91 presses downwards a rail 93, which thus, through the medium of a further lever 94, effects the necessary rotation of the shaft 64.

In the latter case the apparatus, during the ascent of the change-over key, under the action of the springs 50, immediately returns to its original position. In the first-mentioned case this occurs as soon as the lock 89, 90 is released by the forward tilting of the rail 86.

According to the invention, moreover, the device illustrated in Figures 27 and 28 is also provided, by means of which, during the manual or automatic transposition of the cam plates 2 from the calculating position to the idle position or ordinary writing position or conversely the electric driving motor is switched on or off.

This device consists of a mercury tilting switch 95, the poles 96 of which are connected in the working circuit of the electric motor and which is tilted in the manner shown in the drawing, from the shaft 64, by means of a sector-shaped swinging member 97 and a link rail 98, and thereby breaks the circuit (Figure 28) or closes it again (Figure 27).

What we claim is:—

1. In a typewriting and calculating machine of the type including a paper carriage, calculating and counting mechanisms adjustable on said carriage, numeral keys, means for transmitting values determined by the depression of said numeral keys to said calculating and counting mechanisms, said means comprising a stepped cylinder and adjusting wheel displaceable relatively to said stepped cylinder, the combination of a shaft, levers radially arranged on said shaft and making various angles with one another, said levers being adapted to displace said adjusting wheel relatively to said stepped cylinder to varying extents depending upon the angles at which they are severally set, cam plates adapted to act on said levers and to be moved by the numeral keys, said cam plates also being adapted to throw into engagement means for driving the stepped cylinder and the value-transmitting means and to prevent complete depression of the numeral keys that are not actuated.

2. In a typewriting and calculating machine, the combination of calculating mechanism and numeral keys, a differential mechanism including cam plates each formed with an aperture and with a slot leading from the aperture to the outer periphery and adapted to be rocked when the corresponding numeral key has been depressed, a shaft, and levers rigidly secured to said shaft and making various angles with one another, said levers being adapted to adjust the calculating mechanism and each of said levers cooperating with the aperture and slot in one of the cam plates and being adapted to be actuated by the rocking of said cam plate to adjust the calculating mechanism when the corresponding key lever is depressed and to execute its rocking movement within the aperture of its associated cam plate when any other key lever is depressed.

3. A typewriting and calculating machine comprising cam plates, numeral key levers each adapted to actuate one of said cam plates, calculating mechanisms, transmission members for the adjustment and engagement of said calculating mechanisms, said transmission members being actuated by said cam plates, a stop pin on each numeral key lever, and engaging means on the cam plates adapted to co-operate with said stop pins, the cam plates being capable of being located in any one of three positions, in one of which, if a key lever is depressed, the associated cam plate is rocked and the calculating apparatus actuated, in another of which all the key levers are locked, and in the third of which all the key levers are released for typewriting only.

4. In a typewriting and calculating machine, the combination with a plurality of rockably mounted cam plates, of a shaft, and levers rigidly secured to said shaft and making various angles with one another, one of said levers being adapted to engage with each of the cam plates, and the co-operating surfaces of the cam plates and levers being so shaped that upon one cam plate being rocked the complete rocking of the remaining cam plates is prevented.

5. A typewriting and calculating machine as claimed in claim 3, further comprising calculating apparatus, the counting mechanism being displaceable over said calculating apparatus for automatically adjusting the cam plates into any one of the three said positions, and manual means for adjusting the cam plates into the calculating and typewriting positions.

6. A typewriting and calculating machine as claimed in claim 3, the engaging means on the cam plates consisting of a tappet shaped stop member on the upper part of the cam plate, said stop member being so shaped that when the cam plates are in the calculating position the stop member is rocked by the stop pin on the numeral key lever, whereas when the cam plates are in the position for locking the keys said stop member checks the movement of the stop pin, while in the typewriting position of the cams said stop member remains unaffected by the stop pin.

7. A typewriting and calculating machine as claimed in claim 3, the engaging means on the cam plates consisting of a tappet shaped stop member on the upper part of the cam plate, said stop member having a check piece mounted thereon, said check piece being resiliently connected with the stop member so that it yields during the upward movement of the stop pin when the cams are in the typewriting position.

8. A typewriting and calculating machine as claimed in claim 3, further comprising a shaft 64, levers mounted thereon, stop pins 62 on said levers, projecting teeth on the cam plates, tension springs causing said projecting teeth to bear against said stop pins 62, and means for rotating said shaft 64 to adjust the cam plates into any one of three said positions.

9. A typewriting and calculating machine comprising a rotatable shaft, cam plates secured to said shaft, calculating mechanism, means for driving said calculating mechanism, an upwardly extending shaft longitudinally displaceable for engaging and disengaging said driving means, spur wheels journalled loose on the cam plate shaft, pawls rocking with the cam plates to impart partial rotations to said spur wheels, a shaft 55, spring actuated roller levers sliding over the teeth of said spur wheels to convert said partial rotations into reciprocating rotary movements of said shaft 55, and further transmission members for raising and lowering the upwardly extending shaft as a result of said reciprocating rotary movements.

10. A typewriting and calculating machine as claimed in claim 3, further comprising a shaft 64, levers mounted thereon, stop pins 62 on said levers, projecting teeth on the cam plates, tension springs causing said projecting teeth to bear against said stop pins 62, a movable counting mechanism, a bell crank lever capable of being rocked by said counting mechanism when moved, a slidable rail, a toothed drive, an upwardly extending shaft, a sleeve enclosing part of said upwardly extending shaft, the bell crank lever transmitting its rocking movement by means of the slidable rail and of the toothed drive to said sleeve, a link member, and a lever, the rocking movement being transmitted from the sleeve to the shaft 64 by means of said link member and lever.

11. A typewriting and calculating machine comprising rockable cam plates, numeral keys adapted when depressed to rock said cam plate, a stepped cylinder, an adjusting wheel displaceable relatively to said stepped cylinder, differential mechanism including the cam plates arranged between the keys and the wheel, a sliding counting mechanism operably associated with the stepped cylinder, a pivotally mounted bell crank lever, connections between the said bell crank lever and said cam plates to rock the latter, a pawl pivoted to said bell crank lever and positioned in the path of movement of the said counting mechanism, a spring interposed between the pawl and the said bell crank lever, and the sliding counting mechanism being adapted to rock the bell crank lever when actuated in one direction and to yield without rocking the bell crank lever when actuated in the other direction.

12. A typewriting and calculating machine as claimed in claim 3, further comprising a rotatable shaft 64 for shifting the cam plates from the calculating position into the typewriting position, a lever on said shaft 64, an upwardly extending rail pivoted to said lever, a push button at the upper end of said rail, the rail being capable of being depressed by means of said push button, and being formed with a notch in its edge, a locking member adapted to engage with said notch to lock the rail in its depressed position, and a tension spring adapted to draw said locking member into the notch.

13. A typewriting and calculating machine as claimed in claim 3, further comprising a rotatable shaft for shifting the cam plates into the typewriting position, a lever 94 on said shaft, a change-over key lever, a pin mounted on said change-over key lever, and a rail adapted to be depressed by said pin, said rail being linked to the lever 94.

14. A typewriting and calculating machine as claimed in claim 3, further comprising a stepped cylinder, means for driving said stepped cylinder, control means for starting and stopping said driving means, a rotatable shaft for adjusting the cam plates into and out of the calculating position, and intermediate members for transmitting movements from said shaft to the control means to stop the driving means when the cam plates are shifted into the typewriting position and to start the driving means when the cam plates are shifted into the calculating position.

In testimony whereof we have signed our names to this specification.

THEODOR EUGEN BUSCHMANN.
CHRISTIAN EMIL ARNO CLAUS.